Figure 4:
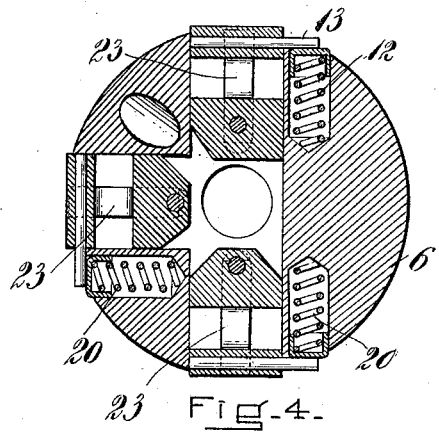

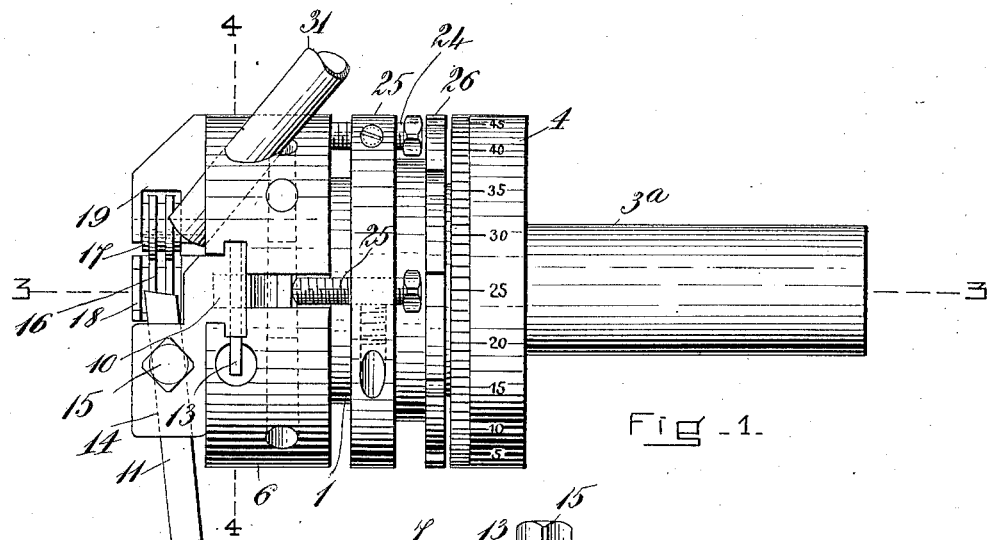
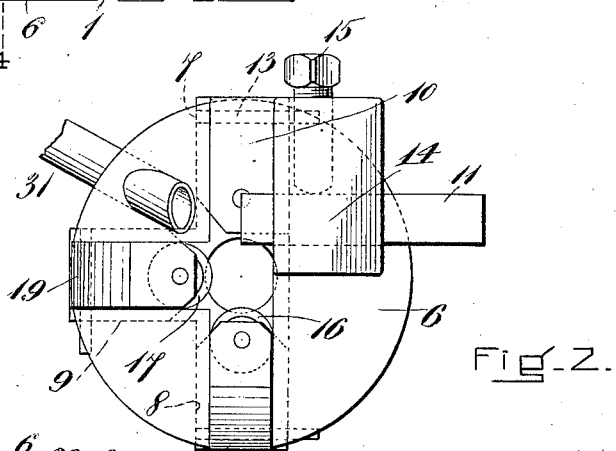
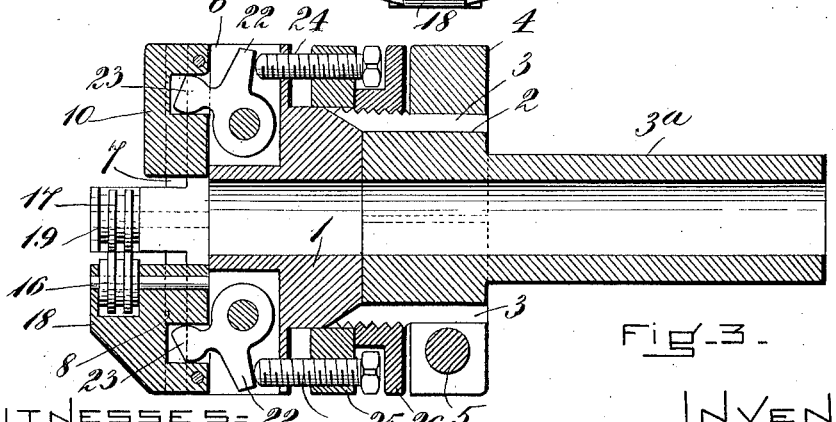

W. S. DAVENPORT.
TURNING TOOL.
APPLICATION FILED FEB. 14, 1910.

1,032,382.

Patented July 16, 1912.
2 SHEETS—SHEET 2.

WITNESSES:
K. D. McPhail
M. L. Gilman

INVENTOR:
William S. Davenport
by Phillips Van Everen & Fish
Attys

UNITED STATES PATENT OFFICE.

WILLIAM S. DAVENPORT, OF NEW BEDFORD, MASSACHUSETTS.

TURNING-TOOL.

1,032,382.    Specification of Letters Patent.    Patented July 16, 1912.

Application filed February 14, 1910. Serial No. 543,660.

*To all whom it may concern:*

Be it known that I, WILLIAM S. DAVENPORT, a citizen of the United States, residing at New Bedford, in the county of Bristol and State of Massachusetts, have invented certain new and useful Improvements in Turning-Tools; and I do hereby declare the following to be a full, clear, and exact description of the invention, such as will enable others skilled in the art to which it appertains to make and use the same.

The invention relates to a tool for turning cylindrical work to a definite size, and more particularly to a tool of this character adapted for use in automatic screw machines and machines of a similar character.

The object of the invention is to provide a tool of this type which may be conveniently and accurately set or adjusted to produce the desired size of work, and which will operate without danger of marking or marring the finish of the work during the withdrawal of the tool.

To these ends a feature of the invention contemplates the provision in a tool comprising a cutting tool and back rests for engaging and holding the work with relation to the cutting tool, of means for simultaneously and uniformily adjusting the cutting tool and back rest to turn different sizes of work. By this construction the cutting tool and back rest are accurately maintained in proper relation to each other and to the axis of the work and tool at all times after they have been once brought into proper relation, and consequently the proper adjustment for any given size of work may be quickly and conveniently made without care or skill on the part of the operator, and without danger of inaccuracies in the relative adjustments which would result in imperfect work, or in a marking of the work by the cutting tool as the tool is withdrawn after completion of the turning operation.

A further feature contemplates the provision in a tool provided with means for simultaneously adjusting the cutting tool and back rests, of means for also adjusting these parts independently. This means enables the proper relation between the tool and back rests to be secured without requiring extreme accuracy in the construction of the tool, and also enables the proper relative adjustments to be readily made for correcting any inaccuracies which may develop by reason of wear during the continued use of the tool. This independent adjustment also enables the cutting tool and back rests to be readily brought into proper relation to compensate for any inaccuracy in the alinement of the work spindle and tool carrying support of the particular machine in which the tool is to be used.

In addition to these features above referred to, the invention also includes certain features which will be hereinafter described and referred to in the claims.

The various features of the invention will be readily understood from an inspection of the accompanying drawings, in which—

Figure 5:
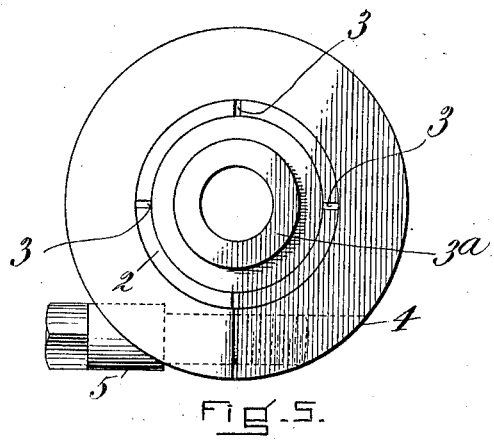
Figures 6, 7:
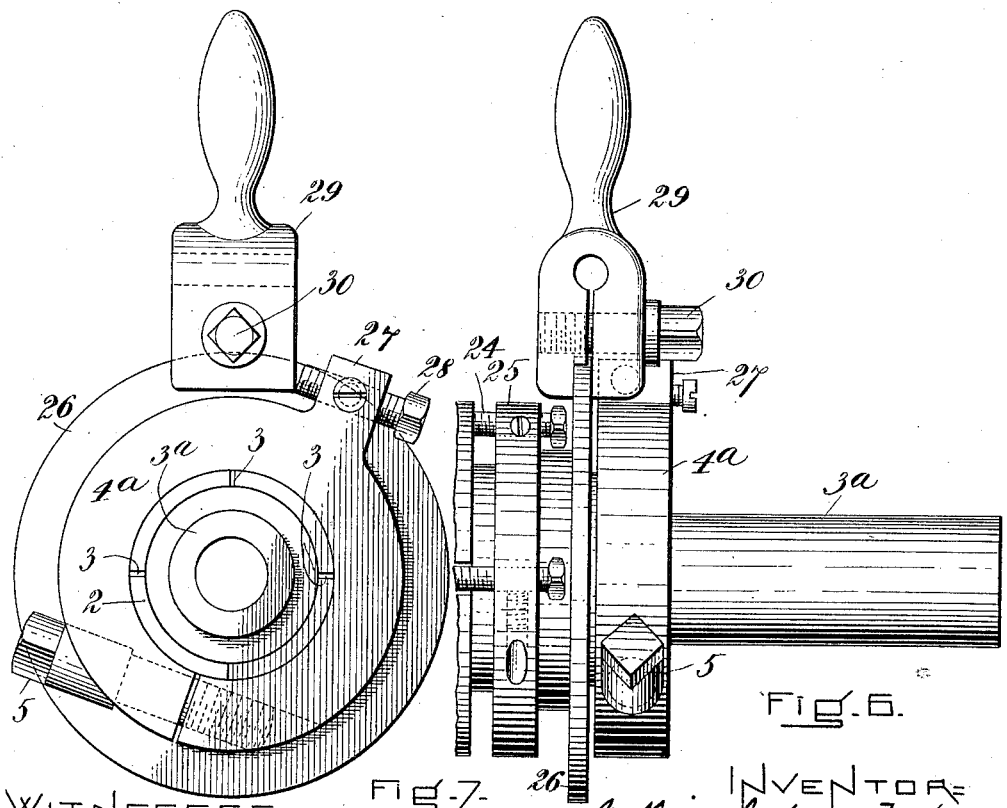

Figure 1 is an elevation of a tool embodying the features of the invention in their preferred form; Fig. 2 is an end elevation looking toward the right in Fig. 1; Fig. 3 is a longitudinal section on line 3—3, Fig. 1; Fig. 4 is a transverse section on line 4—4, Fig. 1; Fig. 5 is an end view looking toward the left in Fig. 1; Fig. 6 is a side view showing a modified construction; and Fig. 7 is an end view looking toward the left in Fig. 6.

In the construction of tool shown in the drawings the cutting tool, back rests and parts for adjusting and manipulating them are supported and carried in a body 1. The rear end of the body 1 is provided with a chamber or bore 2 adapted to fit the head of the shank or arbor 3ª by which the tool may be supported in the turret or other tool carrier of a screw machine. The walls of the chamber 2 are slotted longitudinally at 3 so that they may be sprung inward to clamp the tool body to the head of the shank by means of a surrounding clamping collar 4. This collar is split, and is provided with a clamping screw 5, by manipulation of which the tool may be firmly clamped upon the shank, or may be unclamped and removed. At its front end the body 1 is provided with a cylindrical flange or head 6 in which the carrier blocks for the cutting tool and back rests are mounted. In the construction shown the head 6 is provided at its front end with three radially extending guideways 7, 8 and 9, the guideways 7 and 8 being arranged diametrically opposite each other, and the guideway 9 being arranged midway between the guideways 7 and 8 and at right angles thereto. The carrier block 10 in which the cutting tool 11 is secured is mounted to slide in the guideway 7, and is forced yieldingly in a direction away from the axis of the body 1 by a spring 12. This spring is arranged in a recess formed in the head 6, and engages a pin 13 projecting laterally from the block. The tool carrying block 10 extends forward in front of the head 6, and is provided with a socket 14 for receiving the cutting tool 11, which is firmly held in the socket by a clamping screw 15.

The back rests for maintaining the work in proper relation to the cutting tool comprise two rolls 16 and 17 which are mounted in the carrier blocks 18 and 19. This carrier block 18 for the roll 16 is mounted in the guideway 8, and the roll 16 is so arranged that it engages the work diametrically opposite to the point where the cutting tool acts. This back rest roll 16 acts in connection with the cutting tool to caliper or determine the size of the work, and may be termed a calipering back rest. The slide 19 for the roll 17 is mounted in the guideway 9 and the roll is arranged to engage the work and prevent it from springing away from the tool during the cutting action of the tool upon the work. The carrier blocks 18 and 19 for the back rests are forced yieldingly in a direction away from the axis of the tool by springs 20 similar to the springs 12, which are mounted in the head 6 and arranged to bear against pins 21 projecting laterally from the carrier block.

The means shown for simultaneously adjusting the cutting tool and back rests in accordance with the size of the work being produced, comprises three bell crank levers 22 pivotally mounted in the head 6 of the tool body, and provided with arms 23 engaging slots in the respective carrier blocks. The bell crank levers are engaged by the ends of three adjusting screws 24 carried by a collar 25 which is mounted to slide freely on the tool body 1 back of the head 6. The rear side of the collar 25 bears against the front face of an adjusting nut 26 which is threaded on the tool body. By turning the nut 26, the collar 25 may be moved and its position accurately determined. When the collar 25 is thus moved, the three carrier blocks are moved radially and to a uniform extent through the screws 24 and bell crank levers 22. The cutting tool and back rests may therefore be readily adjusted for any desired size of work, and the proper relation between the cutting tool, back rests and axis of the work and tool is accurately maintained, whatever the adjustment. By means of the screws 24, the cutting tool and back rests may be independently adjusted in bringing the cutting tool and back rests into proper relation when assembling the parts of the tool or in readjusting the cutting tool and back rests to compensate for any inaccuracies which may develop during the use of the tool. By means of these screws, also, the operator may bring the back rests and cutting tool into correct relation for the machine in which the tool is to be used, in case the tool carrying support is not in exact alinement with the work carrying spindle in that machine. After the proper adjustment has been once made, the back rests and cutting tool may be quickly and conveniently set for any desired size of work by turning the nut 26, and the proper relation between the cutting tool, work rests and axis of the tool and work will be accurately maintained for each adjustment.

In using the tool in so-called hand machines in which the turret or tool carrying support is advanced and retracted manually, the tool may be provided with means for operating the nut 26 to withdraw the cutting tool and back rests from engagement with the work at the end of the turning operation, and for accurately restoring them to proper position preparatory to operating upon the next piece of work. In using the tool in this manner, the clamping collar 4ª, by which the tool body is secured to the shank 3ª, may be provided with a projecting lug 27 for supporting an adjustable stop screw 28. An operating handle 29 may be secured to the flange of the nut 26 by a clamping bolt 30 in such position that it will engage the stop screw 28 when the cutting tool and back rests are in position for turning the work to the desired size. When the advance movement of the tool has been completed, the nut 26 may be operated by movement of the handle 29 to withdraw the cutting tool and back rests from engagement with the work so that they will not engage the work during the return movement of the tool. After the tool has been retracted, the cutting tool and back rests may be accurately returned to their original or turning position by movement of the handle 29 into engagement with the stop screw 28. The head 6 of the tool body may be provided with a tube or nozzle 31 for directing oil or water upon the work at the point of operation of the cutting tool.

While it is preferred to employ the specific construction and arrangement of the parts shown and described, since this is the most simple and efficient construction of tool embodying the invention which has yet been devised, it will be understood that the specific construction and arrangement of the parts is not essential to the broader features of the invention, and may be varied and modified without departing therefrom.

Having explained the nature and object of the invention, and specifically described one form of tool in which it may be embodied, what I claim is:—

1. A turning tool, having, in combination, a tool body, a cutting tool mounted on the body, an opposed calipering back-rest mounted on the body, a second rest mounted on the body between the tool and calipering rest to prevent the work springing away from the tool during the cutting action, and means for simultaneously and uniformly adjusting the cutting tool and rests toward and from the axis of the tool and for securing them in adjusted position, substantially as described.

2. A turning tool, having, in combination, a tool body, a carrier for a cutting tool mounted for radial adjustment in the body, an opposed carrier for a calipering back-rest mounted for radial adjustment in the body, a carrier for a second back-rest also mounted for radial adjustment in the body, devices for determining the positions of the carriers with relation to the axis of the tool, and means for simultaneously adjusting said devices, substantially as described.

3. A turning tool, having, in combination, a tool body, a carrier for a cutting tool mounted for radial adjustment in the body, an opposed carrier for a calipering back-rest mounted for radial adjustment in the body, a carrier for a second back-rest also mounted for radial adjustment in the body, devices for determining the positions of the tool and back-rest with relation to the axis of the tool, means for simultaneously adjusting said devices, and means for independently adjusting said devices, substantially as described.

4. A turning tool, having, in combination, a tool body, a carrier for a cutting tool mounted for radial adjustment in the body, an opposed carrier for a calipering back rest mounted for radial adjustment in said body, a carrier for a second back rest also mounted for radial adjustment in said body, and means for simultaneously and uniformly adjusting said carriers, substantially as described.

5. A turning tool, having, in combination, a body, a radially adjustable tool carrying block mounted in said body, radially adjustable carrier blocks for back rests adjustably mounted in said body, an adjusting nut threaded on said body, and devices connecting said nut and blocks for simultaneously adjusting said blocks, substantially as described.

6. A turning tool, having, in combination, a body, a cutting tool carrier and back rest carriers mounted for radial adjustment upon said body, a bell crank lever connected with each of the blocks, adjusting screws engaging said bell crank levers, a movable support for said adjusting screws, and an adjusting nut for operating said support, substantially as described.

7. A turning tool, having, in combination, a tool body, a carrier for a cutting tool mounted for radial adjustment in the body, an opposed carrier mounted for radial adjustment in the body, a calipering roll mounted in the second carrier, a third carrier mounted for radial adjustment in the body between the first two carriers, a work engaging roll in the third carrier to prevent the work springing away from the tool during the cutting action, and means for simultaneously and uniformly adjusting the carrier, substantially as described.

8. A turning tool, having, in combination, a tool body, a carrier for a cutting tool mounted for radial adjustment in the body, an opposed carrier mounted for radial adjustment in the body, a calipering roll mounted in the second carrier, a third carrier mounted for radial adjustment in the body between the first two carriers, a work engaging roll in the third carrier for preventing the work springing away from the tool during the cutting, means for simultaneously and uniformly adjusting said carriers, and means for independently adjusting the carriers, substantially as described.

WILLIAM S. DAVENPORT.

Witnesses:
EDWARD T. BANNON,
MARY L. SAWYER.

Copies of this patent may be obtained for five cents each, by addressing the "Commissioner of Patents, Washington, D. C."